(12) United States Patent
Dolgopolsky et al.

(10) Patent No.: US 7,901,765 B2
(45) Date of Patent: Mar. 8, 2011

(54) FOAM LAMINATE PRODUCT AND PROCESS FOR PRODUCTION THEREOF

(75) Inventors: Inna Dolgopolsky, Richmond Hill (CA); Petar Pepic, Toronto (CA)

(73) Assignee: Proprietect L.P. (CA)

( * ) Notice: Subject to any disclaimer, the term of this patent is extended or adjusted under 35 U.S.C. 154(b) by 0 days.

(21) Appl. No.: 10/896,038

(22) Filed: Jul. 22, 2004

(65) Prior Publication Data

US 2005/0019546 A1    Jan. 27, 2005

Related U.S. Application Data

(60) Provisional application No. 60/489,913, filed on Jul. 25, 2003.

(51) Int. Cl.
  *B32B 3/26* (2006.01)
  *B60R 13/01* (2006.01)
(52) U.S. Cl. ............ 428/316.6; 428/319.3; 428/319.7; 428/74; 428/76; 296/214; 296/39.1; 296/187.05
(58) Field of Classification Search .......... 428/316.6, 428/319.3, 319.7, 74, 76; 296/214, 39.1, 296/187.05
See application file for complete search history.

(56) References Cited

U.S. PATENT DOCUMENTS

| | | | | |
|---|---|---|---|---|
| 3,867,240 | A | * | 2/1975 | Doerfling ................ 428/71 |
| 4,508,774 | A | * | 4/1985 | Grabhoefer et al. .......... 428/220 |
| 4,695,501 | A | | 9/1987 | Robinson |
| 4,863,791 | A | * | 9/1989 | Steward et al. ............ 428/310.5 |
| 5,316,835 | A | * | 5/1994 | Groft et al. .............. 442/30 |
| 5,683,796 | A | | 11/1997 | Kornylo et al. ............ 428/304.4 |
| 5,721,038 | A | | 2/1998 | Kornylo et al. |
| 5,989,699 | A | * | 11/1999 | Kuczynski et al. ........ 428/316.6 |
| 6,150,287 | A | | 11/2000 | Boyd et al. |
| 6,287,678 | B1 | | 9/2001 | Spengler |
| 6,355,339 | B1 | * | 3/2002 | Sherwood ............... 428/309.9 |
| 6,921,503 | B1 | * | 7/2005 | Sherwood ................ 264/46.4 |

(Continued)

FOREIGN PATENT DOCUMENTS

EP    0 264 495 A1    4/1988

(Continued)

OTHER PUBLICATIONS

Polyurethane Foam as an Integral "Core" Component of Automotive Headliner by I. Dolgopolsky and J.A. Duley, Polyurethanes Expo '99, Sep. 12-15, 1999.

*Primary Examiner* — Hai Vo
(74) *Attorney, Agent, or Firm* — Katten Muchin Rosenman LLP

(57) ABSTRACT

A laminate product comprising a foam core having a pair of opposed major surfaces and a cover layer secured with respect to each major surface is described. The cover layer is essentially free of fibreglass and comprises a polymeric substrate having disposed therein a plurality of porous material layers. It has been found that the use of fibreglass as a reinforcing material (and other sheet materials having a tensile modulus of greater than or equal to about 0.5 GPa when measured pursuant to ASTM D 5034) in a foam laminate product can be avoided by using a porous material layer in place of the fibreglass. In a preferred embodiment of the invention, the porous material layer has a tensile modulus less than that of fibreglass mat yet can be used to produce a foam laminate product having significantly higher strength properties.

28 Claims, 2 Drawing Sheets

U.S. PATENT DOCUMENTS

2001/0046587 A1* 11/2001 Michael et al. ............... 428/137
2004/0043181 A1* 3/2004 Sherwood

FOREIGN PATENT DOCUMENTS

| | | |
|---|---|---|
| EP | 0 718 097 A | 6/1996 |
| EP | 0 993 935 A | 4/2000 |
| WO | WO 96/13377 A | 5/1996 |
| WO | WO 98/06600 A | 2/1998 |
| WO | WO 99/46116 A | 9/1999 |
| WO | WO 01/10637 A1 | 2/2001 |
| WO | WO 02/42119 A2 | 5/2002 |

* cited by examiner

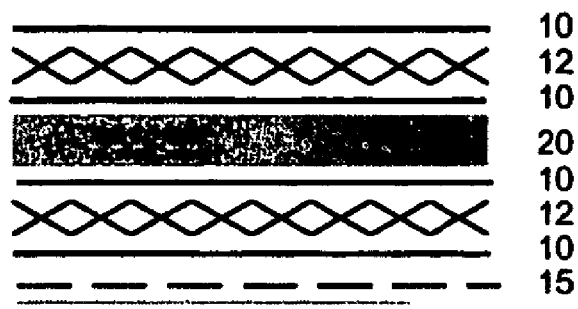
FIGURE 1 – PRIOR ART
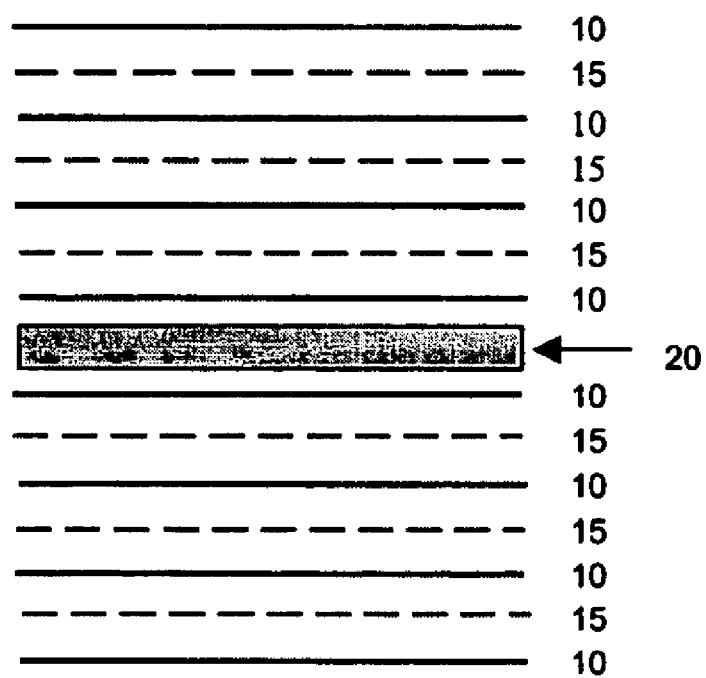
FIGURE 2

FOAM LAMINATE PRODUCT AND PROCESS FOR PRODUCTION THEREOF

CROSS-REFERENCE TO RELATED APPLICATION

The present application claims the benefit under 35 U.S.C. §119(e) of provisional patent application Ser. No. 60/483,913, filed Jul. 25, 2003, the contents of which are hereby incorporated by reference.

BACKGROUND OF THE INVENTION

1. Field of the Invention

In one of aspects the present invention relates to a foam laminate product, more particularly such a product adapted for use in the interior of a vehicle. In another of its aspects, the present invention relates to process for the production of a foam laminate product. In a highly preferred embodiment, the present invention relates to a headliner, more particularly a vehicular headliner. In this preferred embodiment, an aspect of present invention relates to process for the production of a headliner.

2. Description of the Prior Art

Energy absorbing devices (also known as energy management devices) and structural devices are known. Such devices can take one of a variety of shapes and forms. Currently, one of the major applications for energy absorbing devices and/or structural devices is in vehicles, particularly automobiles. Such devices, when used in vehicles, would be of great convenience if they could be included in or substituted for trim panel and, indeed, are commonly referred to as trim panels.

In recent years, one particularly useful application of such energy absorbing devices and/or structural devices which has developed is in vehicular headliners. Vehicular headliners are generally known in the art. More particularly, automotive headliners are generally known in the art. In many case an automotive headliner will serve as a structural device and a device which combines both structural and energy absorbing properties.

As is known such automotive headliners are used to line the roof of the automobile. Conventionally, an automotive headliner is a laminate structure comprising, for example, a foam or other padded element having a cover material secured thereto. The cover material comprises a finished outer surface that faces the interior of the automobile and this the cover material is disposed adjacent or is comprised in the so-called A-surface of the headliner. The surface of the headliner adjacent the A-surface is the so-called B-surface. The B-surface of the headliner may or may not comprise a cover material.

Conventionally, foamed automotive headliners have made produced from isocyanate-based foams such as polyurethane foams.

When producing automotive headliners from polyurethane foams, it is conventional to utilize the so-called free-rise or slab polyurethane foams.

In a typical slab polyurethane foam production plant, the resultant foam is usually produced by dispensing a foamable composition into a trough having an open top (also known as a tunnel) and a conveyor bottom to move the composition away from the mixhead as the foam rises. Low pressure mixing is typically used and involves metering the components for foam production into a mixhead equipped with a stirrer (or other suitable agitation means) at a pressure generally less than 500 psi (usually 200-350 psi). The components are mixed in the mixhead and the foamable composition is expanded to produce polyurethane foam. As is known in the art, low pressure mixing is conventionally used to produce slabstock foam. It is known to vary the properties of the resulting foam by varying the nature and/or amount of one or more of the metered components.

Commercial slabstock polyurethane foam plants produce foam "buns" having dimensions such as 4 feet (height)×6 feet (width)×100 feet (length). Each bun is then cut into a plurality shorter length (e.g., 5 feet) buns, depending on the specifications of the particular automotive headliner being produced. The shorter length bun is then sliced into sheets of appropriate thickness (e.g., ⅛ to ½ inches). Each sheet is then covered, trimmed and secured in the automobile. It is also known in the art to subject each sheet to further processing steps such as thermoforming so to confer to the planar sheet a slightly contoured appearance which more closely assumes the shape of the roof of the automobile.

Thus, slabstock polyurethane foam conventionally used in the production of automotive headliners is known as a foam (e.g., a resilient foam) having at least one uncontoured surface (i.e., the foam is a "free-rise" foam).

U.S. Pat. Nos. 5,683,796 and 5,721,038 [both to Kornylo et al. (Kornylo)] teach a vehicular headliner made from molded polyurethane foam. The headliner taught by Kornylo purportedly comprises a substantially constant density while having central sections with a greater cross-sectional thickness than peripheral portions. The central sections must be relatively thick such that the headliner possesses acceptable sound absorbing properties while the peripheral portions must be relatively thin so as to facilitate securing of the headliner to the roof of the automobile.

International Publication Number WO 02/42119 [Zolfaghari] teaches an improvement to the headliner taught by Kornylo. Specifically, Zolfaghari teaches a vehicular headliner comprising energy management capabilities to improve vehicle occupant safety.

Regardless of the precise mode of production, it is conventional to reinforce the headliner using fibreglass, typically fibreglass mat or chopped fibreglass.

For example, if the headliner is produced from slabstock foam, it is conventional to initially form a blank comprising a foam core, an adhesive layer on both sides of the foam core and fibreglass mat layer or chopped fibreglass on each adhesive layer (the blank may also comprise other layers such as a trim cover and the like). The blank is then subjected to a forming operation which serves to shape the foam core and adhere the fibreglass mats to each surface of the shaped foam core. Conventional forming operations include thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

There is an emerging need to obviate or mitigate the use of fibreglass in vehicular foam parts such as headliners. The principal reason for this is to facilitate recycling of the foam parts. Unfortunately, elimination of fibreglass from such vehicular foam parts is difficult to achieve without a loss in energy management and/or structural properties of the foam part, resulting in possible compromising vehicle occupant safety.

Thus, there is a need for a vehicular foam part, such as a vehicular headliner, which can be made without fibreglass with no loss of energy management and/or structural properties. It would be highly desirable if such a foam part could be made using relatively inexpensive materials on existing equipment thereby minimizing or eliminating the need for extra capital expenditure.

SUMMARY OF THE INVENTION

It is an object of the present invention to obviate or mitigate at least one of the above-mentioned disadvantages of the prior art.

Accordingly, in one of its aspects, the present invention provides a laminate product comprising a foam core having a pair of opposed major surfaces and a cover layer secured with respect to each major surface, the cover layer being essentially free of fibreglass and comprising a polymeric substrate having disposed therein a plurality of porous material layers.

In another of its embodiments, the present invention provides a vehicular headliner comprising an A-surface disposed to face an interior of a vehicle and a B-surface substantially opposed to the A-surface, the headliner comprising: a foam element having an compression force deflection at 10% deflection in the range of from about 5 pounds to about 200 psi when measured pursuant to ASTM 3574-D, a first cover layer secured with respect to the A-surface, and a second cover layer secured with respect to the B-surface;
  wherein: (i) the headliner is essentially free of fibreglass, (ii) each of the first cover layer and the second cover layer comprises a polymeric substrate having disposed therein from 1-10 porous material layers, and (iii) the headliner has a strength of at least about 10 N when measured pursuant to ASTM D 5034.

In yet another of its aspects, the present invention provides a process for producing a laminate foam product having a pre-determined shape, the process comprising the steps of:
  positioning a blank in a shaping device, the blank comprising a foam core having a pair of opposed major surfaces and a cover layer disposed on each major surface, the cover layer being essentially free of fibreglass and comprising at least one pair of alternating layers of a polymeric layer and a porous material layer; and
  subjecting the blank to a temperature of at least about 100° C. in the shaping device at a pressure sufficient to cause: (i) the polymeric layers to form a polymeric substrate in which the porous layers are disposed, and (ii) the foam core to assume the pre-determined shape.

In yet another of its aspects, the presents invention provides a laminate product comprising a foam core having a pair of opposed major surfaces and a cover layer secured with respect to each major surface, the cover layer comprising a polymeric substrate having disposed therein one or more porous material layers, each porous material layer having a tensile modulus of less than about 0.5 GPa when measured pursuant to ASTM D 5034.

Thus, the present inventors have discovered a novel reinforcing technique for foam laminate products. Specifically, it has been found that the use of fibreglass as a reinforcing material (and other sheet materials having a tensile modulus of greater than or equal to about 0.5 GPa when measured pursuant to ASTM D 5034) in a foam laminate product can be avoided by using a porous material layer in place of the fibreglass. In a preferred embodiment of the invention, the porous material layer has a tensile modulus less than that of fibreglass mat yet can be used to produce a foam laminate product having significantly higher strength properties. This is a highly surprising result and is counterintuitive to what would have been expected. More preferably, the porous material layer having a tensile modulus of less than about 0.5 GPa, more preferably less than about 0.4 GPa, even more preferably in the range of from about 0.01 GPa to about 0.4 GPa, even more preferably in the range of from about 0.02 GPa to about 0.3 GPa, most preferably in the range of from about 0.02 GPa to about 0.2 GPa, when measured pursuant to ASTM D 5034 (specimen dimension 2"×6"; speed 50 mm/min.; and distance between grips 75 mm). In this most preferred embodiment, the tensile modulus of the porous material layer is more than an order of magnitude less than fibreglass mat conventionally used for reinforcement purposes yet the present foam laminate product can have a strength more than double that of a laminate foam product conventionally reinforced with fibreglass mat.

While a preferred embodiment of the present invention is directed to application in vehicular foam parts, such as vehicular headliners, it will be appreciated by those of skill in the art that scope of the invention is not restricted to such applications. Thus, it may be possible to use the invention in other applications such as floorboards, cargo vehicle mats, Tonneau covers, and other applications where it is desirable to have a relatively lightweight article which has energy absorbing and/or structural properties equivalent to articles made using fibreglass reinforcement but avoids the use of fibreglass.

BRIEF DESCRIPTION OF THE DRAWINGS

Embodiments of the present invention will be described with reference to the accompanying drawings, wherein like reference numerals denote like parts, and in which:

FIG. 1 illustrates a schematic of a prior art foam laminate product;

FIG. 2 illustrates a schematic of foam laminate product in accordance with a preferred embodiment of the present invention.

DETAILED DESCRIPTION OF THE PREFERRED EMBODIMENTS

Figure 3:
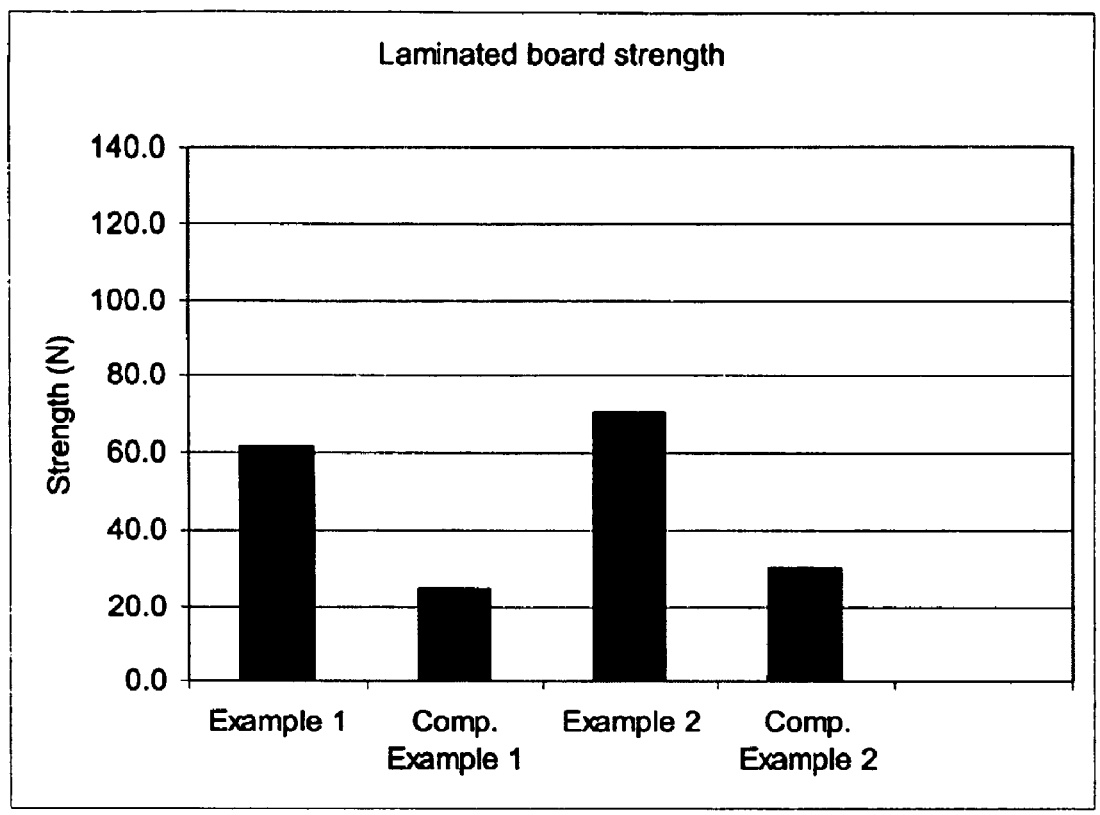
FIG. 3 illustrates the strength properties of various foam laminate products produced in the Examples.

The preferred foam for use in the core portion of the present laminate product is a foamed isocyanate-based polymer. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

Typically, the foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-Q-, —CO—, —S—, —S-Q-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

wherein both i and j are integers having a value of 2 or more, and Q' is a polyfunctional organic radical, and/or, as additional components in the reaction mixture, compounds having the general formula:

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 100 to about 10,000, more preferably from about 100 to about 4,000, most preferably from about 100 to about 3,500.

If the core portion is to comprise a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 100 and a functionality of from 1 to 25. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the foamed isocyanate-based polymer core portion typically will further comprise a blowing agent. As is known in the art, water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

To produce the core portion made from a foamed isocyanate-based polymer, a catalyst is usually incorporated in the reaction mixture. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

Preferably, the foam core portion of the present laminate product comprises an compression force deflection at 10% deflection in the range of from about 2 psi to about 200 psi when measured pursuant to ASTM 3574-D, more preferably in the range of from about 5 psi to about 100 psi when measured pursuant to ASTM 3574-D most preferably, in the range of from about 10 psi to about 80 psi when measured pursuant to ASTM 3574-D. Throughout this specification, when reference is made to ASTM 3574-D, the test sample has the following dimensions: 2 ft.×2 ft.×1 in. (last dimension is the thickness).

Non-limiting and preferred examples of suitable polyurethane foams for use in producing the present headliner are available from Woodbridge Foam Corporation under the tradename Stratas.

Generally, the polyurethane foam suitable for use in the present headliners and having desirable energy management and/or structural characteristics may be produced from the following general non-limiting formulation:

| Component | Amount |
| --- | --- |
| Polymer Polyol | 100-0 parts |
| Polyol | 0-100 parts |
| Crosslinker | 0-30 parts/100 parts total polyol |
| Catalyst | 0.05 to 3.5 parts/100 parts total polyol |
| Silicone Surfactants | 0-1.5 parts/100 parts total polyol |
| $H_2O$ | 0.5 to 25 parts/100 parts total polyol |
| Isocyanate | Adequate quantity for an index of from about 0.60 to 1.30 ratio of NCO equivalents to the equivalents of NCO reactive sites. |

Suitable crosslinkers, catalysts and silicone surfactants are described in U.S. Pat. Nos. 4,107,106 and 4,190,712.

The preferred polyurethane foam suitable for use in the present headliner may be produced from the following formulation:

| Component | Amount |
| --- | --- |
| Polymer Polyol | 20-100 parts |
| Polyol | 0-80 parts |
| Crosslinker | 5-15 parts/100 parts total polyol |
| Catalyst | 0.5-1.2 parts/100 parts total polyol |
| Silicone Surfactants | 0.3-1.1 parts/100 parts total polyol |
| $H_2O$ | 1.75-2.75 parts/100 parts total polyol |
| Isocyanate | Adequate quantity for an index of from about 0.8 to 1.1 ratio of NCO equivalents to the equivalents of NCO reactive sites. |

The foam core in the present laminate product may have a substantially uniform density—this is typically a characteristic of a molded foam (i.e., a foam produced by constraining the expanding mass on all surfaces as it is converted to the foam product). Alternatively, and preferably, the foam core has a variable density—this is typically a characteristic of a slab foam (i.e., a foam produced by a process in which at least one surface of the expanding mass is unconstrained so that the mass may "free rise" as it is converted to the foam product) after conventional forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo* '99 (1999).

Preferably, the foam core in the present laminate product has a density in the range of from about 0.5 to about 30 pounds per cubic foot, more preferably in the range of from about 1 to about 20 pounds per cubic foot, even more preferably in the range of from about 2 to about 15 pounds per cubic foot, most preferably in the range of from about 2 to about 8 pounds per cubic foot.

The present laminate product further comprises a cover layer disposed on opposed surfaces of the foam core portion. Each cover layer comprises a polymer substrate and a plurality of porous material layers.

Preferably, the polymeric substrate comprises an organic polymer.

In one preferred embodiment, the polymeric substrate comprises thermoplastic polymer. In another preferred embodiment, the polymeric substrate comprises an elastomeric material. In yet another preferred embodiment, the polymeric substrate comprises a thermosetting material (e.g., epoxy, polyurethane, polyurea, phenolics, acrylates, arylates, silicones, polysulfides, polyesters or mixtures of two or more of these).

Non-limiting examples of useful polymer substrates may be selected from the group comprising polyolefins, polyesters, nylons, poly(vinyl choride), polyurethanes, polyacrylates, latex, styrene-butadiene polymers, nitrile-butadiene polymers, silicone polymers, mixtures thereof, copolymers thereof and interpenetrating networks thereof.

Preferably, the polymeric substrate comprises a polyolefin. More preferably, the polymeric substrate comprises polyethylene, polypropylene, butyl rubber and mixtures thereof. Most preferably, the polymeric substrate comprises polyethylene, polypropylene and mixtures thereof.

The porous material layer used in each cover layer may be the same or different. Preferably, the porous material layer used in each cover layer is the same.

It will be appreciated that the porous material layer may be woven or non-woven. Further information on such materials may be found on the following websites: http://www.non-wovens-group.com, http://www.johnrstarr.com and http://www.inda.org.

Preferably, each cover layer comprises a plurality of porous material layers, more preferably from 2 to 15 porous material layers, even more preferably from 2 to 12 porous material layers, even more preferably from 2 to 10 porous material layers, most preferably from 4 to 8 porous material layers.

The preferred method for producing the present laminate product will now be discussed. Prior to this discussion, there will be a brief discussion of the prior art approach to producing a vehicular headliner.

Thus, with reference to FIG. 1, there is illustrated in schematic form, the various layers of materials used in the production of a conventional headliner product. These components include a foam core 20 having its major surfaces covered by two cover layers. Each cover layer consists of a single fibreglass mat 12 interposed between a pair of polymer layers 10. One of the cover layers also includes a scrim layer 15. When it is desired to produce the vehicular headliner material, a stack or blank containing the layers described above is placed in a conventional thermoforming device (or other a shaping device) after which the stack or blank is subjected to heat and pressure for a sufficient time such that polymer layers 10 serve to permeate into fibre glass mat 12 and also serve to adhere the cover layers to foam core 20. Concurrently, foam core 20 is shaped to the desired shape of the vehicular headliner.

With reference to FIG. 2, there is illustrated, in schematic form, the layers used in a preferred embodiment of the present laminate product. As shown, fibreglass mat 12 used in the conventional approach (FIG. 1) has been replaced so that the resulting laminate product contains no fibreglass component in the cover layer adjacent to each major surface of the foam core.

Thus, the major surfaces of foam core 20 are covered by a cover layer. In the illustrated embodiment, each cover layer consists of four polymer layers 10 between which is interposed a porous material layer 15. Those of skill in the art will appreciate that, for a given cover layer, it is preferred to have pairs of polymer layer 10 and porous material layer 15 with an extra polymer layer 10 to create a stack or blank having N porous material layers and N+1 polymer layers. Foam core 20, polymer layers 10 and porous material layers 15 may be selected from the materials described hereinabove.

When it is desired to produce the present laminate product, a stack or blank similar to the one shown in FIG. 2 is disposed in a conventional forming or shaping device such as a device capable of carry out forming operations such as thermoforming and thermocrushing (also known as "Cold Forming"). For more detail on the production of vehicular headliners, see, for example, "Polyurethane Foam as an Integral "Core" Component of Automotive Headliner", Dolgopolsky et al., *Polyurethanes Expo '99* (1999).

The stack or blank is then subjected to a temperature of at least about 100° C. in the shaping device at a pressure and for period of time sufficient to cause polymeric layers 10 to form a polymeric substrate in which porous layers 15 are disposed. Concurrently, foam core 20 assumes the pre-determined shape (contoured or planar) of the laminate product. Thus, during the process, each of polymer layers 10 permeates into adjacent porous material layers 15 with the result that porous layers 15 are substantially completely encapsulated by the polymer material in polymer layers 10.

During the process, polymer layers 10 melt or otherwise become flowable to wet out, fully permeate and/or encapsulate porous material layers 15. By using multiple such porous material layers 15 and relying on the permeation effect described above, the resulting foam laminate product has energy management and/or energy management properties which are desirable and these are achieved without the use of conventional fibre glass mat reinforcement techniques.

Preferably, the heating step in the present process is conducted at a temperature of at least about 120° C., more preferably in the range of from about 100° C. to about 250° C., even more preferably from about 120° C. to about 250° C., most preferably from about 150° C. to about 220° C.

Embodiments of the present invention will now be described with reference to the following Examples which are provided for illustrative purposes only and should not be used to limit or construe the invention.

EXAMPLES 1-2

In the Examples, the following materials were used

Core foam (thickness=8 mm)—Polyurethane foam have a density of 2.5 pounds per cubic foot (Example 1) and 3.5 pounds per cubic foot (Example 2) commercially available from Woodbridge Foam Corporation under the tradenames Stratas 225™ and Stratas 135™, respectively;

Polymer layer—Polyethylene film commercially available from the Dow Chemical Company under the tradename Dow XUS 66167™;

Porous material layer—Commercially available form Freudenberg Nonwovens Group under the tradename Lutradur™ Type 402 30 gsm; and Chopped fibreglass rovings—Commerially available from Vetrotex Saint-Gobain under the tradename Vetrotex 221 113 SMC.

Sheets of polymer layer and porous material layer were cut and alternately stocked on the both sides of the core foam as shown in FIG. 2 (i.e., 3 sheets of polymer layer interposed between 4 sheets of porous material layer) to form a stack or blank. In Example 1 the foam core had a density of 2.5 pounds per cubic foot whereas, in Example 2, the foam core had a density of 3.5 pounds per cubic foot.

For comparative purposes to additional samples were prepared. Comparative Example 1 was prepared from a blank similar to Example 1 and Comparative Example 2 was prepared from a blank similar to Example 2 except, in case, the alternating sheets of polymer layer and porous material layer were replaced with a single layer of chopped fiberglass (~130 g) interposed between a pair of polymer layers—i.e., the stack or blank used in Comparative Example 1 and Comparative Example 2 was similar schematically to that illustrated in FIG. 1.

Each blank or stack was manually passed through a Meyer Laminator, consisting of an adjacent heating zone and cooling zone. The process parameters for lamination were as follows:

| | |
|---|---|
| conveyor speed: | 6 m/min-7 m/min; |
| hot Platens temp.: | 180° C.-200° C.; |
| pressure roller offset: | 1.0 mm v 1.5 mm; and |
| cold platens temperature: | 20° C. |

The resulting samples were conditioned for 24 hours.

Thereafter, the strength of each sample was determined in accordance with ASTM D 5034 (utilizing a three-point loading system). The conditions used during the testing were:

specimen dimensions: 76.2×192 mm;
cross head rate: 50 mm/min;

support points and loading nose had cylindrical shape and diameter of 20 mm; and distance between support points (span): 152 mm.

The strength of the laminated board is defined as Maximum load value (N) measured at failure of the sample.

The results are illustrated in FIG. 3. As shown the foam laminate product of Example 1 had a strength which was more than double (almost triple) that of the foam laminate product of Comparative Example 1. Similarly, the foam laminate product of Example 2 had a strength which was more than double that of the foam laminate product of Comparative Example 2. This is truly surprising and unexpected in view of the fact that the tensile modulus of the porous material layer used in Examples 1 and 2 was 0.1 GPa whereas the tensile modulus of the porous material layer used in Comparative Examples 1 and 2 corresponded to that of a continuous fibreglass mat having a tensile modulus of at least 0.5 GPa.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, if it is desired to produce the present laminate product from a molded foam core, this can be achieved by forming and shaping the cover layers from the stacks referred to in FIG. 2 independently of the foam core. The foam core could be molded independently of the cover layers (i.e., the conversion of the foamable composition to the foam core would be completed in a mold constraining all surfaces of the foam core) and the formed elements can then be adhered to each other with conventional adhesive. Further, it is possible to include a finishing or trim cover on one major surface of the present laminate product thereby producing a finished part. Still further, it is possible to add other elements to the foam laminate product during production thereof. For example, it is possible to incorporate one or more of: (i) an electrically conduct layer in the foam laminate product to provide a heating function, (ii) a sound absorbing layer to improve acoustical performance of the foam laminate product, and/or (iii) a flame retardant layer to improve flame retardant properties of the foam laminate. Still further, it is possible to subject the foam laminate product to a post-production step such as perforation to improve acoustical performance of the foam laminate product—this is particularly difficult to do with conventional foam laminate products which are reinforced with fiberglass. It is therefore contemplated that the appended claims will cover any such modifications or embodiments.

All publications, patents, patent applications and subject matter on Internet website referred to herein are incorporated by reference in their entirety to the same extent as if each individual publication, patent or patent application was specifically and individually indicated to be incorporated by reference in its entirety.

What is claimed is:

1. A vehicular headliner comprising:
    a polyurethane foam core having (i) a pair of opposed major surfaces and (ii) a cover layer secured to each major surface of said polyurethane foam core,
    each cover layer being essentially free of fibreglass, and comprising a plurality of separate, individual porous material layers substantially completely encapsulated by a corresponding plurality of polyolefin substrates, each cover layer consisting of alternating layers of the polyolefin substrates and the individual porous material layers, each individual porous material layer consisting of a sheet of non-woven synthetic organic polymer, said organic polymer is being different from said polyolefin substrate, wherein each of the plurality of polyolefin substrates is in direct contact with the porous material layers.

2. The vehicular headliner defined in claim 1, wherein the foam core comprises a compression force deflection at 10% deflection in the range of from about 2 psi to about 200 psi, when measured pursuant to ASTM 3574-D.

3. The vehicular headliner defined in claim 1, wherein the foam core comprises a compression force deflection at 10% deflection in the range of from about 5 psi to about 100 psi, when measured pursuant to ASTM 3574-D.

4. The vehicular headliner defined in claim 1, wherein the foam core comprises a compression force deflection at 10% deflection in the range of from about 10 psi to about 80 psi, when measured pursuant to ASTM 3574-D.

5. The vehicular headliner defined in claim 1, wherein the foam core has a substantially uniform density.

6. The vehicular headliner defined in claim 1, wherein the foam core has a variable density.

7. The vehicular headliner defined in claim 1, wherein the foam core has a density in the range of from about 0.5 to about 30 pounds per cubic foot.

8. The vehicular headliner defined in claim 1, wherein the foam core has a density in the range of from about 1 to about 20 pounds per cubic foot.

9. The vehicular headliner defined in claim 1, wherein the foam core has a density in the range of from about 2 to about 15 pounds per cubic foot.

10. The vehicular headliner defined in claim 1, wherein the foam core has a density in the range of from about 2 to about 8 pounds per cubic foot.

11. The vehicular headliner defined in claim 1, wherein each cover layer comprises from 2 to 15 porous material layers.

12. The vehicular headliner defined in claim 1, wherein each cover layer comprises from 2 to 12 porous material layers.

13. The vehicular headliner defined in claim 1, wherein each cover layer comprises from 2 to 10 porous material layers.

14. The vehicular headliner defined in claim 1, wherein each cover layer comprises from 4 to 8 porous material layers.

15. The vehicular headliner defined in claim 1, wherein each polyolefin substrate is selected from the group consisting of polyethylene, polypropylene, butyl rubber, and mixtures thereof.

16. The vehicular headliner defined in claim 1, wherein each polyolefin substrate comprises polyethylene.

17. The vehicular headliner defined in claim 1, wherein the porous material layers are made from a polymer selected from the group consisting of polyesters, polyolefins, nylons, mixtures thereof, copolymers thereof, and interpenetrating networks thereof.

18. The vehicular headliner defined in claim 1, wherein each cover layer is adhered to the foam core.

19. The vehicular headliner defined in claim 1, having strength of at least about 5 N when measured pursuant to ASTM D 5034.

20. The vehicular headliner defined in claim 1, having a strength in the range of from about 10 to about 200 N when measured pursuant to ASTM D 5034.

21. The vehicular headliner defined in claim 1, having a strength in the range of from about 20 to about 150 N when measured pursuant to ASTM D 5034.

22. The vehicular headliner defined in claim 1, having a strength in the range of from about 20 to about 100 N when measured pursuant to ASTM D 5034.

23. The vehicular headliner defined in claim 1, wherein the foam core comprises a thickness of greater than or equal to about 2 mm.

24. The vehicular headliner defined in claim 1, wherein the foam core comprises a thickness in the range of from about 2 mm to about 20 mm.

25. The vehicular headliner defined in claim 1, wherein the foam core comprises a thickness in the range of from about 4 mm to about 15 mm.

26. The vehicular headliner defined in claim 1, wherein the foam core comprises a thickness in the range of from about 4 mm to about 12 mm.

27. The vehicular headliner defined in claim 1, having a strength of at least about 10 N when measured pursuant to ASTM D 5034.

28. A vehicular headliner comprising:
a polyurethane foam core having (i) a pair of opposed major surfaces and (ii) a cover layer secured to each major surface of said polyurethane foam core,
each cover layer being essentially free of fibreglass, and comprising a plurality of separate, individual porous material layers substantially completely encapsulated by a corresponding plurality of the polyolefin substrates, each cover layer consisting of alternating layers of the polyolefin substrates layers and the individual porous material layers, each of the plurality of polyolefin substrates is in direct contact with the porous material layers, each porous material layer having a tensile modulus of less than about 0.5 GPa when measured pursuant to ASTM 5034, each individual porous material layer comprising consisting of a sheet of non-woven synthetic organic polymer, said organic polymer being different from said polyolefin substrate.

* * * * *